United States Patent [19]

Horiuchi et al.

[11] Patent Number: 5,209,471
[45] Date of Patent: May 11, 1993

[54] PRESSURELESS TENNIS BALL

[75] Inventors: Kuniyasu Horiuchi, Kobe; Yoshinobu Nakamura, Nishinomiya, both of Japan

[73] Assignee: Sumitomo Rubber Industries, Ltd., Kobe, Japan

[21] Appl. No.: 708,317

[22] Filed: May 31, 1991

[30] Foreign Application Priority Data

Jun. 1, 1990 [JP] Japan .................. 2-145226

[51] Int. Cl.$^5$ ............................................. A63B 39/00
[52] U.S. Cl. ..................... 273/61 C; 525/232; 525/236; 525/237; 260/998.14; 524/908
[58] Field of Search ............ 525/232; 260/998.14; 524/908; 273/61 C

[56] References Cited

U.S. PATENT DOCUMENTS

| | | | |
|---|---|---|---|
| 4,145,045 | 3/1979 | Pocklington | 273/61 C |
| 4,306,719 | 12/1981 | Haines et al. | 273/61 C |
| 4,580,781 | 4/1986 | Houriuchi et al. | 273/61 C |
| 4,592,550 | 6/1986 | Houriuchi | 273/61 C |
| 4,848,770 | 7/1989 | Shama | 273/228 |

FOREIGN PATENT DOCUMENTS

| | | | |
|---|---|---|---|
| 217159 | 5/1957 | Australia | 525/232 |
| 766651 | 9/1967 | Canada | 273/61 C |
| 794878 | 9/1968 | Canada | 525/232 |
| 1177224 | 1/1970 | United Kingdom | 525/232 |

OTHER PUBLICATIONS

Patent Abstracts of Japan, unexamined applications, C field, vol. 13, No. 3, Jan. 6, 1989, The Patent Office Japanese Gov., pp. 117 C 557. Kokai-No. 63-215 746.
Patent Abstracts of Japan, unexamined applications, C field, vol. 11, No. 69, Mar. 3, 1987, The Patent Office Japanese Gov., p. 164 C 407. Kokai-no. 61-228 039.

*Primary Examiner*—Carman J. Seccuro, Jr.
*Attorney, Agent, or Firm*—Armstrong, Westerman, Hattori, McLeland & Naughton

[57] ABSTRACT

A pressureless tennis ball which has excellent rebound properties and produces a satisfactory feeling of striking retained over a long period of time, the tennis ball having a hollow spherical core made from a rubber composition containing a rubber and 5 to 60 parts by weight of polyethylene per 100 parts by weight of the rubber.

3 Claims, No Drawings

PRESSURELESS TENNIS BALL

BACKGROUND OF THE INVENTION

The present invention relates to a pressureless tennis ball having excellent rebound properties and a good feeling of striking.

Two types of tennis balls are known, one being pressurized tennis balls wherein the hollow core is pressurized by means of air or a certain kind of gas to about 0.6–1.2 $kg/cm^2$ higher pressure than atmospheric pressure, and the other being pressureless tennis balls wherein the internal pressure of the hollow core is approximately equal to atmospheric pressure, for example, the excess pressure being 0 or up to 0.4 $kg/cm^2$.

The pressurized tennis balls have good rebound properties (flight performance) and give a good feeling when struck by a racket, since the pressure of air or the gas in the core contributes to improvements in rebound properties of the balls and feeling of striking the balls. However, air or the gas of super-atmospheric pressure contained in the core gradually diffuses out through the core wall owing to a pressure difference between the inside and outside of the core, and the internal pressure decreases in several months. Consequently, the rebound properties of the balls are reduced, thus the flight of the balls is reduced and the balls are no longer satisfactorily used. It is accordingly necessary for the pressurized tennis balls to be used within a certain specified term after the manufacture, or to be kept in pressurized containers prior to use for preventing the decrease of the internal pressure. However, these procedures are inconvenient and expensive.

The pressureless tennis balls have been developed in order to eliminate such a defect of the pressurized tennis balls. The pressureless tennis balls have no problem of the lowering in ball properties resulting from the decrease of the pressure in the core as encountered in pressurized tennis balls. However, the rebound properties, feeling of striking and the like of the pressureless tennis balls must rely on the impact resilience of the rubber composition itself which constitutes the core, because there is no contribution of the pressure in the core to the rebound properties and striking feeling of the balls. The rebound properties and striking feeling on the level of pressurized tennis balls cannot be achieved by merely applying rubber compositions used for the cores of pressurized tennis balls to the production of cores for the pressureless tennis balls.

Accordingly, in order to bring the rebound properties and the feeling of striking close to those of the pressurized tennis balls, it is proposed to improve these properties by incorporating in rubber compositions for tennis ball core a high styrene resin, a rubber such as ethylene-propylene rubber or ethylene-propylene-diene rubber, or an additive such as an ionomer resin or wood flour as disclosed, for example, in Japanese Patent Publication Kokai No. 55-96171 and No. 54-34934 and Japanese Patent Publication Kokoku No. 46-25289.

However, pressureless tennis balls available at the present time are hard and do not give a satisfactory feeling when struck by a racket. The softer ones are poor in flight and do not give a feeling of striking like pressurized tennis balls, and moreover the resistance to deformation is markedly lowered by repeated forceful striking during game or playing.

It is an object of the present invention to provide a pressureless tennis ball having characteristics comparable to those of pressurized tennis balls such as rebound properties and feeling of striking.

The above and other objects of the present invention will become apparent from the description hereinafter.

SUMMARY OF THE INVENTION

It has now been found that the above object of the present invention can be achieved by preparing a tennis ball core from a rubber composition in which a polyethylene is incorporated in addition to a rubber.

In accordance with the present invention, there is provided a pressureless tennis ball comprising a hollow core and a cover therefor, said core being made from a rubber composition comprising a rubber and 5 to 60 parts by weight of a polyethylene per 100 parts by weight of said rubber.

By the incorporation of polyethylene in the rubber composition, the impact resilience of the tennis ball core is raised, thereby improving the rebound properties of the ball, and the deformation is made proper. Thus, the rebound properties and feeling of striking comparable to those of pressurized tennis balls can be obtained, and also the lowering of the feeling of striking owing to repeated striking can be decreased.

The term "pressureless tennis ball" as herein used means a tennis ball comprising a hollow spherical core having an internal pressure substantially equal to atmospheric pressure or an internal pressure of up to 0.4 $kg/cm^2$ above atmospheric pressure.

DETAILED DESCRIPTION

Usual rubbers conventionally used for the preparation of tennis balls can be used in the present invention as the rubber component of the rubber composition for preparing the hollow core. Examples of the rubber are, for instance, natural rubber, cis-1,4-polybutadiene, styrene-butadiene rubber, and the like. The rubbers may be used alone or in admixture thereof.

A polyethylene is used in an amount of 5 to 60 parts by weight, preferably 5 to 50 parts by weight, per 100 parts by weight of the rubber component. When the amount of the polyethylene is less that 5 parts by weight, the obtained core is soft, so no improvements in rebound properties and striking feeling of the ball are obtained. If a high styrene resin or the like is further added in order to make the core hard, the impact resilience is lowered and the feeling of striking also becomes poor in addition to lowering of flight performance. When the amount is more than 60 parts by weight, the obtained core is so hard that the ball gives a heavy and hard feeling when struck by a racket.

Polyethylene having a Shore D hardness of 45 to 75 and a flexural rigidity of 2,000 to 7,000 $kg/cm^2$ is preferably used in the present invention. Also, it is preferable that the average molecular weight of the polyethylene is at least 30,000, especially at least 800,000. Polyethylenes having an average molecular weight up to 5,000,000 are commercially available at present.

The rubber composition for preparing the hollow cores of pressureless tennis balls according to the present invention may contain additives, in addition to the rubber component and polyethylene, e.g. sulfur or an organic sulfur curing agent, one or more of curing accelerators such as a thiazole compound, a sulfenamide compound, a thiuram compound, a guanidine compound and other known curing accelerators; zinc oxide and stearic acid which are used as activators; an inorganic or organic filler such as basic magnesium carbonate, clays, calcium carbonate, cellulose powder, white carbon (silica) or wood flour.

In a preferred example of the rubber composition for the hollow core, the composition contains, based on 100 parts by weight of the rubber component, 5 to 60 parts by weight of polyethylene, 3 to 40 parts by weight of a filler, 1 to 15 parts by weight of zinc oxide, 0.5 to 2 parts by weight of stearic acid, 2 to 5 parts by weight of sulfur or an organic sulfur curing agent and 1 to 10 parts by weight of a curing accelerator.

The thickness of the core wall is usually selected from 4.0 to 5.0 mm which is substantially equal to that of the core of conventional pressureless tennis balls.

The pressureless tennis balls of the present invention are obtained by producing a ball core from the core rubber composition and covering the ball core with a felt or textile covering.

Kneading for preparing the core rubber composition according to the present invention, formation of the ball cores from the rubber composition and formation of pressureless tennis balls from the balls cores can be made by conventional procedures. For example, the core rubber composition is prepared by mixing a rubber with additives other than the curing agent such as sulfur or an organic sulfur compound and the curing accelerator by means of a suitable mixing machine such as a Banbury mixer, adding the curing agent and the curing accelerator to the mixture on rolls and further mixing them. The ball core is prepared from the composition, for example, by forming the prepared rubber composition into a sheet, extruding it into a rod form by an extruder, placing the cut rod in a mold for producing half-shells, compression-molding it in the mold to produce half-shells, joining a pair of half-shells so as to form a hollow sphere and compression-molding the shells in a mold to give a ball core. At that time, a blowing agent as used in the manufacturing of pressurized tennis balls is not used, but only air of atmospheric pressure is included in the ball core. Also, introduction of a high pressure air or gas into the obtained ball core is not conducted. Therefore, the internal pressure of the obtained ball core is substantially equal to atmospheric pressure. If desired, a blowing agent or a pressurized air or gas may of course be introduced into the core so long as the internal pressure of the core is at most 0.4 kg/cm$^2$. The ball core is then formed into a tennis ball, for example, by covering the core with a felt or textile cover such as a melton cover, and compression-molding the covered core in a mold for ball.

The pressureless tennis balls of the present invention have excellent rebound properties and produce a satisfactory feeling like pressurized tennis balls when struck by a racket. Moreover, the initial feeling of striking is kept for a long period of time even if the balls are repeatedly struck by a racket.

The present invention is more specifically described and explained by means of the following Examples, in which all % and parts are by weight unless otherwise noted.

EXAMPLES 1 to 4 AND COMPARATIVE EXAMPLES 1 to 3

Rubber compositions for hollow cores were prepared according to the recipes shown in Table 1 by kneading a rubber and additives other than sulfur and a curing accelerator in a Banbury mixer, and then kneading the mixture with sulfur and the accelerator on rolls.

Hollow cores having a thickness of 4.4 mm were prepared from the obtained rubber compositions and pressureless tennis balls were prepared by covering the cores with a melton cover according to procedures conventionally adopted to the manufacturing of pressureless tennis balls. That is to say, the rubber compositions were formed into sheets, extruded by an extruder in a rod form, placed in molds for forming half-shells, and compression-molded at 160° C. for 2 minutes to produce half-shells. A pair of the half-shells were joined so as to form a hollow sphere and compression-molded at 150° C. for 12 minutes in a mold to produce a core. The thus obtained cores were covered with a melton cover and subjected to compression molding at 150° C. for 20 minutes in a mold for ball to produce pressureless tennis balls.

The physical properties of the polyethylenes used for the preparation of the rubber compositions are shown in Table 2.

The results of measurement of physical properties and feeling of striking of the obtained pressureless tennis balls are shown in Table 3.

The measurement of the properties shown in Table 3 was made as follows:

Forward deformation (mm)

A tennis ball was subsequently compressed about 2.54 cm in three directions at right angles to each other. This procedure was repeated 3 times. That is to say, the ball was compressed 9 times total. In 2 hours after the above preliminary compression, the deformation was measured by a Stevens compression tester in the following manner.

The ball was compressed with an initial load of 3.5 pounds (1.575 kg) and the deformation was measured, and the ball was then compressed with a load of 18 pounds (8.165 kg) and the deformation was measured. The forward deformation is expressed by the difference (mm) between the deformation by a load of 3.5 pounds and the deformation by a load of 18 pounds.

Return deformation (mm)

After measuring the deformation in the above forward deformation test, the ball was further compressed up to a deformation of 2.54 cm. Then the compression was reduced to a load of 18 pounds (8.165 kg), and the deformation was measured.

Rebound (cm)

A tennis ball was dropped from a height of 100 inches (254 cm) onto a concrete base, and the bound of the ball (height from the concrete base to the bottom of the ball) was measured. The measurement was repeated 3 times and the average was obtained.

TABLE 1

|  | Ex. 1 | Ex. 2 | Ex. 3 | Ex. 4 | Com. Ex. 1 | Com. Ex. 2 | Com. Ex. 3 |
| --- | --- | --- | --- | --- | --- | --- | --- |
| Natural rubber | 60 | 20 | 20 | 20 | 20 | 10 | 60 |
| Cis-1,4-polybutadiene*[1] | 40 | 80 | 80 | 80 | 80 | 50 | 40 |
| EPDM*[2] | — | — | — | — | — | 40 | — |

TABLE 1-continued

|  | Ex. 1 | Ex. 2 | Ex. 3 | Ex. 4 | Com. Ex. 1 | Com. Ex. 2 | Com. Ex. 3 |
|---|---|---|---|---|---|---|---|
| Polyethylene A[*3] | 20 | 40 | — | — | — | — | — |
| Polyethylene B[*4] | — | — | 40 | — | — | — | — |
| Polyethylene C[*5] | — | — | — | 40 | — | — | — |
| High styrene resin[*6] | — | — | — | — | 20 | 5 | 30 |
| Zinc oxide | 5 | 7 | 7 | 7 | 3 | 7 | 5 |
| Wood flour | — | — | — | — | 10 | 12.5 | — |
| Kaolin clay | 10 | 10 | 10 | 10 | — | — | 20 |
| Stearic acid | 1 | 1 | 1 | 1 | 1 | 1 | 2 |
| Sulfur | 3.5 | 2.5 | 2.5 | 2.5 | 3.5 | 3.5 | 2.5 |
| Accelerator DM[*7] | 1.5 | 1.0 | 1.0 | 1.0 | 1.5 | 2 | 2 |
| Accelerator DPG[*8] | 1.0 | 1.0 | 1.0 | 1.0 | 1.0 | 1.0 | 1.0 |

(Notes)
[*1] Product of Japan Synthetic Rubber Co., Ltd. (trade mark "JSR BR11")
[*2] Ethylene-propylene-diene rubber made by Sumitomo Chemical Co., Ltd. (trade mark "Esprene 512F")
[*3] Product of Mitsui Petrochemical Industries, Ltd. (trade mark "MIPELON XM-220")
[*4] Product of Mitsui Petrochemical Industries, Ltd. (trade mark "HI-ZEX MILLION 145M")
[*5] Product of Sumitomo Seika Kabushiki Kaisha (trade mark "FLO-THENE 13142")
[*6] High stryene resin (styrene content 85%) made by Nippon Zoen Co., Ltd. (trade mark "Nippol 2007J")
[*7] Dibenzothiazyl disulfide
[*8] Diphenylguanidine

TABLE 2

|  | Average molecular weight | Density | Hardness | Flexural rigidity (kg/cm$^2$) |
|---|---|---|---|---|
| Polyethylene A | 2,000,000 | 0.940 | 65 | 6,900 |
| Polyethylene B | 1,000,000 | 0.942 | 66 | 6,000 |
| Polyethylene C | 50,000 | 0.925 | 50 | 2,200 |

(Notes)
Average molecular weight: measured by viscosity method
Hardness: measured by Shore D hardness meter
Flexural rigidity: measured according to ASTM D747

TABLE 3

|  | Weight (g) | Forwarded deformation (mm) | Return deformation (mm) | Rebound (cm) | Feeling of striking |
|---|---|---|---|---|---|
| Ex. 1 | 57.6 | 6.2 | 9.3 | 143 | Feeling like pressurized tennis ball; good flight and a little change by repeated striking |
| Ex. 2 | 57.5 | 5.9 | 9.1 | 144 | Same as Ex. 1 |
| Ex. 3 | 57.7 | 6.0 | 9.2 | 144 | Same as Ex. 1 |
| Ex. 4 | 57.8 | 6.4 | 9.4 | 144 | Same as Ex. 1 |
| Com. Ex. 1 | 57.8 | 6.0 | 9.8 | 138 | Proper hardness, but poor in flight and heavy feeling; large change by repeated striking |
| Com. Ex. 2 | 57.8 | 5.8 | 9.0 | 135 | Slightly hard and poor in flight; large change by repeated striking |
| Com. Ex. 3 | 57.6 | 5.0 | 8.3 | 132 | Very hard |
| Regulation of ITF | 56.7 to 58.5 | 5.6 to 7.4 | 8.9 to 10.8 | 135 to 147 |  |

(Note)
ITF: International Tennis Federation

As shown in Table 3, the tennis balls of Examples 1 to 4 according to the present invention show a large rebound as compared with the tennis balls of Comparative Examples 1 to 3, and also have proper forward and return deformation values. These results show that the pressureless tennis balls of the present invention have high rebound properties. Also, the tennis balls of Examples 1 to 4 have a similar feeling of striking to that of pressurized tennis balls. They do not give a hard feeling of striking and show a good flight performance. Further, they show only a little change in feeling of striking by repeated striking. Thus, it would be understood that the pressureless tennis balls of the present invention have good characteristics acceptable sufficiently to high class tennis tournaments.

In addition to the ingredients used in the Examples, other ingredients can be used in the Examples as set forth in the specification to obtain substantially the same results.

What we claim is:

1. A pressureless tennis ball comprising a hollow spherical core and a cover affixed thereon, said core being made of a rubber composition comprising a rubber being at least one member selected from the group consisting of natural rubber, cis-1,4-polybutadiene and a styrene-butadiene rubber, and 5 to 60 parts by weight of a polyethylene per 100 parts by weight of said rubber, said polyethylene having an average molecular weight of at least 30,000, a shore D hardness of 45 to 75 and a flexural rigidity of 2,000 to 7,000 kg/cm$^2$.

2. The tennis ball of claim 1, wherein said polyethylene has an average molecular weight of at least 800,000.

3. The tennis ball of claim 1, wherein the amount of said polyethylene is from 5 to 50 parts by weight per 100 parts by weight of said rubber.

* * * * *